3,106,771
DEVICE FOR SLEEVING WIRE BUNDLES AND THE LIKE
Lloyd W. Spiro, Canoga Park, Calif., assignor to Lockheed Aircraft Corporation, Burbank, Calif.
Filed Oct. 28, 1960, Ser. No. 65,714
1 Claim. (Cl. 29—235)

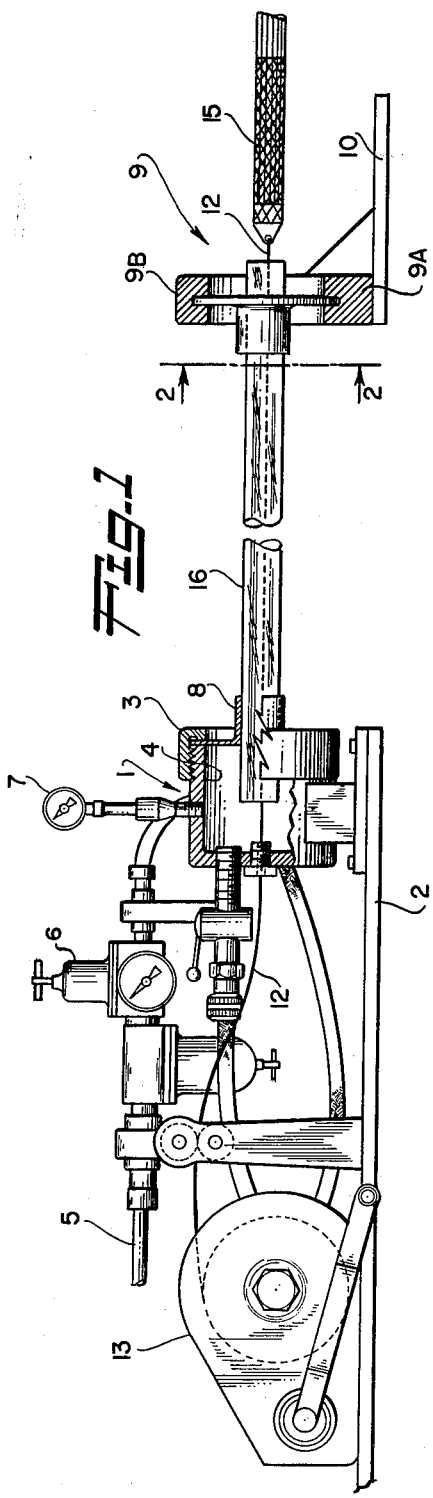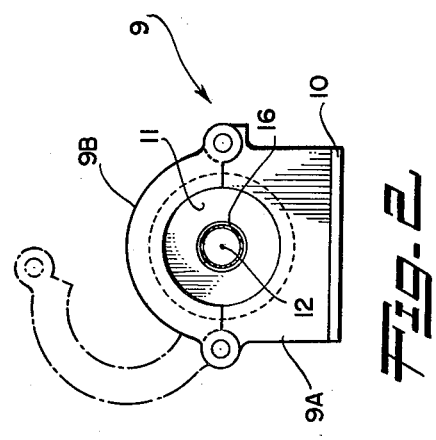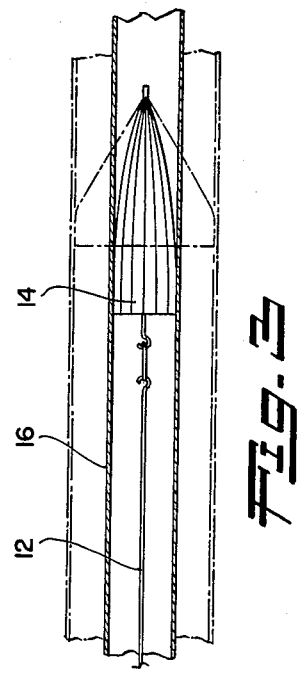

This invention relates to a sleeving device and more particularly to a device for fixed or portable use to be used in pulling wires of various gauges through plastic or the like sleeving in lengths up to five hundred (500) feet and diameters up to two and one-half inches (2½").

Existing machines for sleeving of wire bundles are generally applicable to the assembly of multiconductor cables or are of the nonportable type which are usually large, bulky and expensive. Not only does the expense of such machines prohibit their use for small jobs but in addition such machines are not readily adaptable to a plurality of cable sizes. Therefore, in the past, short runs have necessitated the laboriously time consuming hand approach of pull and tug and in some cases using uncontrolled air to blow the sleeve.

Therefore, an apparatus or device is greatly needed to facilitate the sleeving of short run multiconductor cables of various sizes and of various relatively short lengths. Accordingly, it is an object of the present invention to provide a simplified and inexpensive sleeving device to accommodate various lengths and sizes of electrical conductors.

A second object of this invention is to provide a fixed or portable sleeving device for pulling electric wires or conductors of various gauges through plastic tubing and adaptable for various sizes and lengths of electrical conductors.

Another object of the invention is to provide a sleeving device for applying plastic sleeving to electrical conductors of various gauges and lengths wherein one or more of the noted disdavantages are obviated.

The above and other related objects and advantages of the invention will be made apparent of the following detailed description and the drawings in which:

FIGURE 1 shows a sleeving device partly in cross-section embodying the present invention with various adaptors and accessories, and FIGURE 2 is an end view of the fixture in FIGURE 1 taken on the line 2—2.

FIGURE 3 is a lateral section through the tubing of FIGURE 1 illustrating a detail of FIGURE 1.

Referring to the drawings, a first fixture 1 is mounted on one end of a base plate 2 and has associated therewith a split ring 3. Fixture 1 is provided with an internal chamber 4 to which is attached an external source of pressurized air 5. A valve 6 may be provided for controlling the air and gauge 7 may be utilized for indicating the applied air pressure. One of a plurality of adaptors 8 of various sizes to accommodate different diameter plastic sleeving is held in place on the fitting 1 by means of the ring 3.

The second fixture 9 is mounted on a base plate 10 which is adapted to be attached to a supporting surface at any position desired remote from the fixture 1. Fixture 9 has a split ring comprising a lower arcuate portion 9a which may be an integral part of the base plate and an upper arcuate portion 9b which swings about a pivot joining the two portions. An annular slot in the two portions of the ring provides a clamping and holding means for one of the adaptors 11.

A wire or cable 12 is fed through a small opening in the back of fixture 1, the size of the opening being such as to permit free movement to and fro of the wire and yet prevent excessive loss of air. One end of the wire is attached to a small winch 13 which may be manually or automatically controlled as desired. Attached to the other end of wire 12 are small piston or variable diameter cup or holder 15 for the bundle of conductors. The holder 15 may be preferable of the form of a conventional Chinese finger or the like. As shown in FIGURE 1, a plastic tube or sleeving 16 is attached at one end to the fixture 1 by means of one of the adaptors 8 and at the other end to the fixture 9 by means of one of the adaptors 11. The fixture 9 is attached to a supporting surface at a distance from fixture 1 determined by the length of the plastic sleeving required for the particular operation so that the tubing or sleeving is substantially stretched out. The wire 12 is fed through the tubing very expeditiously by turning on the air pressure by means of valve 6 thereby propelling the piston or cup 14 through the tube and pulling along with it the wire 12. Once the end of the wire or cable has reached the open end of the tubing 16, the cup is removed and the holder 15 is attached to the end of the wire or cable 12. Then the conductor or cables are inserted in the holder 15 and the holder and the end of the bundle fed through the adaptor 11 taking up the slack in the wire 12 by means of the winch at the same time.

The air pressure is turned on thereby expanding the plastic sleeve and the bundle is quickly pulled through the sleeve by manipulation of the winch which may be power-driven if desired.

Various sized adaptors 8 and 11 provide great versatility and permit accommodation of cable having outside diameters ranging from approximately ⅜ of an inch through 2½ inches. As is apparent from the foregoing the complete operation of sleeving a bundle of conductors utilizing the present method requires only two operators.

While a specific embodiment of the invention has been shown and described, it should be understood that certain alterations, modifications and substitutions may be made to the instant disclosure without departing from the spirit and scope of the invention as defined by the appended claim.

I claim:

A device for pulling electrical conductors through plastic sleeving comprising a first fixture having an internal chamber, an adapter closing one side of said chamber and adapted to hold one end of the plastic sleeving in a substantially sealing engagement with said chamber, a second fixture spaced from said first fixture and provided with an adapter for holding the other end of the plastic sleeving, means for applying air under pressure to said chamber, an aperture in the chamber opposite said first mentioned adapter, a wire inserted through said aperture and adapted to engage the electrical conductors beyond the said other end of the sleeving, means including a winch attached to said wire for pulling said conductors through the sleeving when said air pressure is applied to said chamber and in turn said sleeving is expanded.

References Cited in the file of this patent
UNITED STATES PATENTS

| 201,096 | Cowles | Mar. 12, 1878 |
| 710,817 | Stevens | Oct. 7, 1902 |
| 2,347,003 | Searle | Apr. 18, 1944 |
| 2,645,004 | Dorner | July 14, 1953 |
| 2,823,153 | Bunnell | Feb. 11, 1958 |
| 2,869,226 | Schurman | Jan. 20, 1959 |